United States Patent Office 3,319,150
Patented May 9, 1967

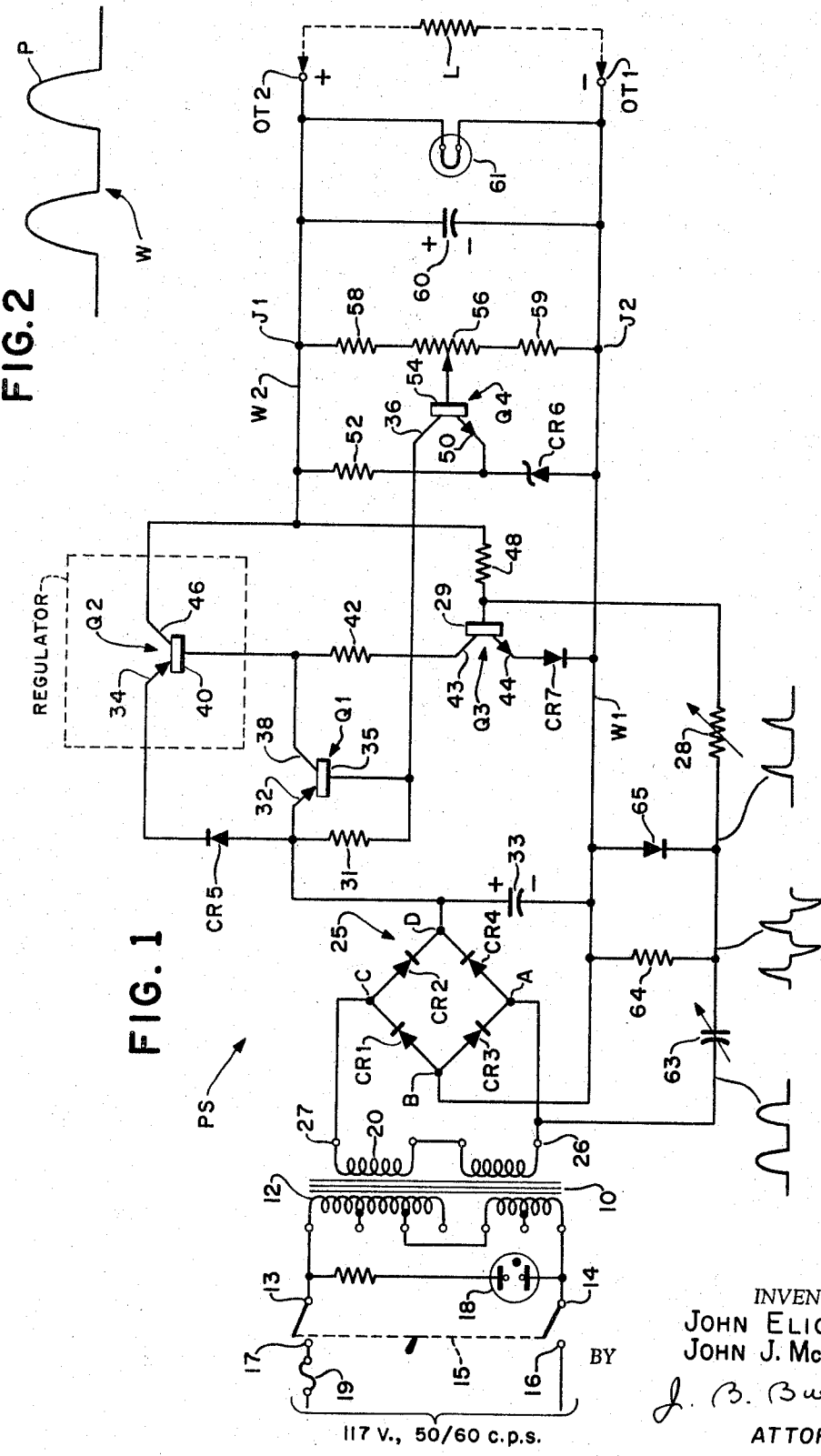

3,319,150
SOLID STATE REGULATED POWER SUPPLY
John Elich, Staten Island, and John J. McManus, Valley Stream, N.Y., assignors to The Western Union Telegraph Company, New York, N.Y., a corporation of New York
Filed Dec. 26, 1963, Ser. No. 333,547
1 Claim. (Cl. 321—18)

This invention concerns a transistorized regulated power supply. One object of the invention is to provide a solid state, transistorized regulated power supply with automatic cut-off means to protect transistors in the circuit from overload in the event a short circuit appears at the output of the circuit.

Another object is to provide a regulated power supply circuit as described with alternating current re-starting means to activate regulator means in the power supply circuit.

Several methods and means of re-starting subsequent to a shorting condition in a power supply circuit have been employed in the past. These include:

(a) Manually operated circuit breakers which would be activated when the shorting condition is removed.

(b) Automatic re-setting circuit breakers which would activate themselves when the potential is returned.

(c) Voltage dividers at the output which provide a re-start bias when the shorting condition is removed.

The present invention avoids the above such prior methods and means and instead provides novel re-start circuit means. Among the advantages of the re-start means embodied in the present invention are: simplicity of the circuit, low power dissipation, noncritical values and parameters of circuit components, and adjustability of circuit components.

The invention will be explained in detail with particular reference to the drawing in which:

FIG. 1 is a diagram of the circuit embodying the invention; and

FIG. 2 is a graphic diagram used in explaining the invention.

Referring first to FIG. 1, the circuit PS includes a transformer 10 having a primary winding 12 with terminals 13, 14. Alternating voltage is applied to winding 12 via a double pole switch 15 connected to power supply terminals 16, 17. A neon tube 18 connected across the winding 12 indicates when the winding is energized. Fuse 19 protects winding 12 against overload.

The transformer has a secondary winding 20 connected at opposite ends to corners A and C of a full wave rectifier bridge 25 including four diode rectifiers CR1–CR4. Corner A of the bridge is located between opposite poles of diodes CR3, CR4. Corner A, which is connected to terminal 26 of winding 20, is connected via a resistor 28 to base 29 of a transistor Q3. Corner B of the bridge located between oppositely poled diodes CR1, CR3 is connected via line W1 to output terminal OT1 to which one terminal of load L may be connected.

Corner C of the bridge is connected to terminal 27 of winding 20. Corner C is located between opposite poles of diodes CR1, CR2. Corner D of the bridge is located between similar poles of diodes CR2, CR4. Corner D is connected to emitter 32 of a transistor Q1. Capacitor 33 is connected between corners B and D of the bridge.

A diode CR5 is connected between emitter 32 of transistor Q1 and emitter 34 of a transistor Q2. Resistor 31 is connected between emitter 32 and base 35 of transistor Q1. Base 35 is connected to collector 36 of transistor Q4. The collector 38 of transistor Q1 is connected to base 40 of transistor Q2 and via resistor 42 to collector 43 of transistor Q3. Emitter 44 of transistor Q3 is connected via a diode CR7 to line W1. The collector 46 of transistor Q2 is connected to output line W2 which terminates at output terminal OT2 of the circuit. The other end of load L may be connected to terminal OT2.

Base 29 of transistor Q3 to which resistor 28 is connected is also connected to line W2 via a resistor 48.

Line W1 is connected to emitter 50 of transistor Q4 via a zener diode CR6 which provides a base-emitter reference potential. Emitter 50 is also connected via resistor 52 to wire W2. Base 54 of transistor Q4 has a variable tap on resistor 56 connected in series with resistors 58, 59 on opposite ends of resistor 56. Resistor 58 is connected to junction point J1 on line W2. Resistor 59 is connected to junction point J2 on line W1. A capacitor 60 is connected across the output lines W1, W2. An indicator lamp 61 is also connected across the output lines W1, W2.

In circuit PS transistor Q2 serves as a regulator device. It supplies current to load L. Transistor Q1 serves as driver for the regulator transistor Q2. Transistor Q4 serves as a sampling device to sample output current of the circuit and to provide base current to the driver transistor Q1. Transistor Q3 serves as a short-circuit protection device.

Under normal operating conditions transistors Q1–Q4 are all conducting. As the load on circuit PS varies, the potential appearing across junction points J1, J2 changes, thereby changing the base current of transistor Q4. The operative current to transistor Q1, and the collector current of Q2 are adjusted in accordance with the change in base current of transistor Q4. In the event a short-circuit condition appears across the load L, the reduction in the output voltage at points J1, J2 to zero will drive the base-emitter reference potential of transistor Q3 to a cut-off condition, whereby transistor Q2 is also driven off. Transistor Q2 is effectively an open switch in its non-conducting condition; therefore the potential at point J1 is zero and none of the transistors will return to an operative conducting condition without assistance external to the transistors. This assistance is supplied by a re-start circuit which will return transistor Q3 to a conductive condition then, in turn, transistors Q2, Q4 and Q1. This circuit will now be described.

As may be seen in FIG. 1, a tap is made from the corner or point A on the alternating current side of the rectifier bridge 25 through a single resistor 28 to the base 29 of transistor Q3. A waveform W of the pulses which are produced at point A with respect to corner or point B, in the emitter circuit of transistor Q3, is shown in FIG. 2. These pulses consist of repetitive positive half-cycle current pulses P. These pulses are continuously applied to the base of transistor Q3 during normal operation, during shorting condition, and during a re-start period. The current value of each pulse P is very small, even when amplified by the transistor Q3, as compared with the higher output of the power supply circuit PS. The output ripple introduced by this unidirectional pulsating bias is negligible in normal operation of the power supply circuit PS. As an example, the amplified ripple current due to pulses P, appearing at the output of transistor Q3, will not normally exceed 10% of the output current of transistor Q3; and the ripple due to the pulsating bias in the output current of circuit PS at terminals OT1, OT2 will not normally exceed 0.1% of 1% of the circuit output current.

If resistor 28 is varied, the pulse amplitude required for the triggering of transistor Q3 changes, resulting in the effective duration of the half-pulse P being varied.

In order to supplement the control magnitude and duration of the bias pulses P, there may be provided an auxiliary differentiating circuit including variable capacitor 63 in series with variable resistor 28, and both fixed resistor 64 and diode rectifier 65 connected across terminals A and B of the bridge circuit 25.

Pulse forms are shown graphically adjacent each of the components of the differentiating circuit. The capacitor 63 differentiates the unidirectional pulses to spike form, and the diode 65 rectifies these pulses by clipping off the negative going pulses. Resistor 28 can be varied to vary the magnitude and duration of the positive spike pulses. The ability to limit the re-start pulse duration is significant and a magnitude of pulses P should be selected such that the period of time that transistor Q3 conducts due to the presence of pulses P is of a limited duration, in order not to burn out the transistors during a period of short circuit. When the shorting condition is removed at load L the pulsing of transistor Q3 will cause it to conduct and, in turn, drive transistor Q2 to conduct. As the potential across the output terminals OT1, OT2 begins to increase, transistor Q4 will conduct and, in turn, transistor Q1, thereby pumping up the voltage across the output of circuit PS. Thus it may be seen that the continuous application of the positive half-cycle pulses acts as a "keep alive" means for transistor Q3.

What is claimed and sought to be protected by Letters Patent is:

A power supply circuit comprising:
 a source of alternating current;
 a full-wave rectifier connected to said source to rectify said current;
 a first transistor connected to said rectifier to derive direct current therefrom;
 a second transistor connected to the first transistor to serve as a regulator device and driven by direct current from the first transistor;
 an output line connected to the second transistor for passing direct current therefrom to a current receiving load;
 a resistor assembly connected across said output line;
 a third transistor connected to said resistor assembly for sampling output current in said output line providing a base current to the first transistor to keep the same in conductive condition;
 a fourth transistor connected to the second transistor to bias the same to conductive condition when the fourth transistor is cut off, the four transistors being normally in a conducting condition when said rectifier is passing direct current, the voltage across said line at which output current passes to said load being the same as the voltage between opposite ends of said resistor assembly, whereby the current passing through the first and second transistors automatically changes to conform with output current drawn by said load from said line, and whereby reduction of voltage across said resistor assembly by a short-circuit condition at said load drives all four transistors to a cut-off condition, and
 circuit means connected directly between the fourth transistor and a point of connection of said rectifier and said alternating current source to apply continuously thereto cyclically recurring unidirectional pulses to the fourth transistor for restarting the fourth transistor after it is cut off, whereby current conduction of the fourth transistor is automatically restarted when said short-circuit condition is terminated so that current conduction in the second, third and first transistors is automatically resumed in the sequence stated to supply current to the output line, said circuit means comprising a variable resistor and a differentiating circuit for selectively adjusting the amplitude and time duration of each of said pulses applied to the fourth transistor during a period of prolonged short circuit at said load.

References Cited by the Examiner

UNITED STATES PATENTS

| | | | |
|---|---|---|---|
| 2,984,779 | 5/1961 | Klees | 321—18 |
| 3,040,235 | 6/1962 | Schemel et al. | 321—19 |
| 3,079,543 | 2/1963 | Decker | 323—22 |
| 3,235,787 | 2/1966 | Gordon et al. | 323—22 |
| 3,237,082 | 2/1966 | Heller et al. | 321—18 |

JOHN F. COUCH, *Primary Examiner.*

M. L. WACHTELL, *Assistant Examiner.*